July 17, 1956 — C. W. CARLSON — 2,754,629
METHOD OF MAKING GLASSWARE ARTICLE
Filed Aug. 5, 1954
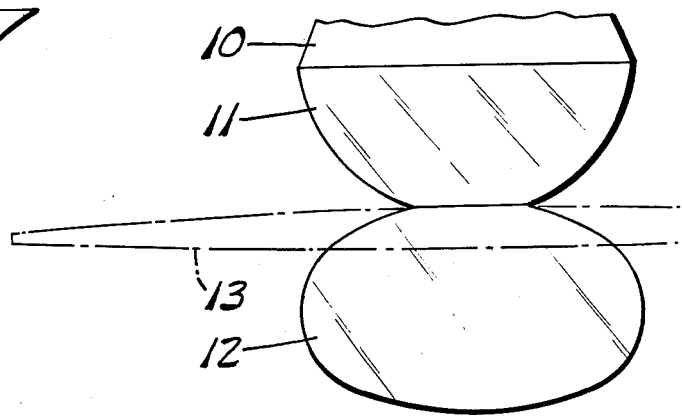
FIG. 1.
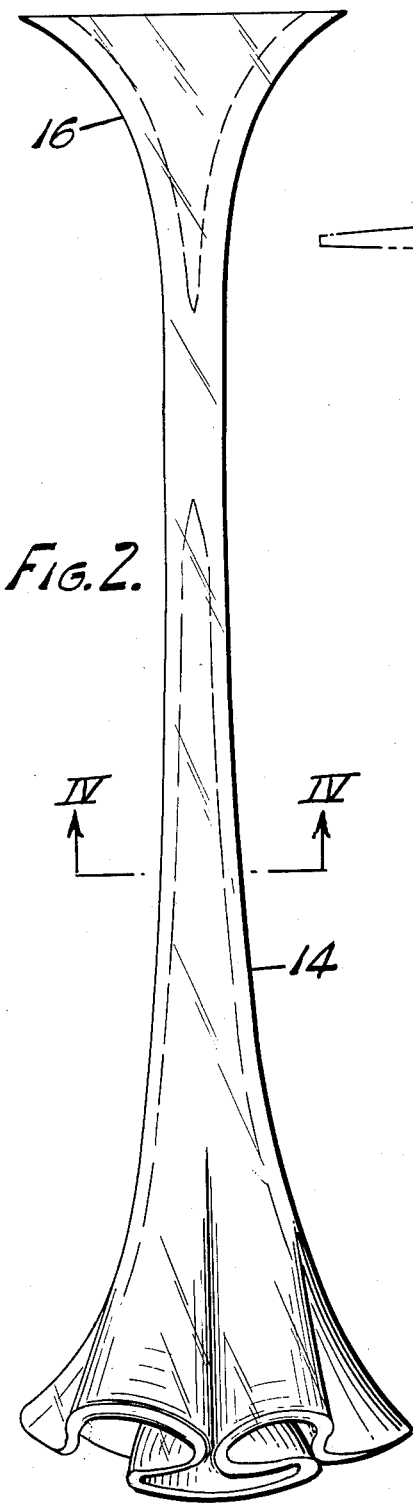
FIG. 2.
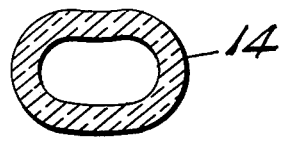
FIG. 4.
FIG. 3.
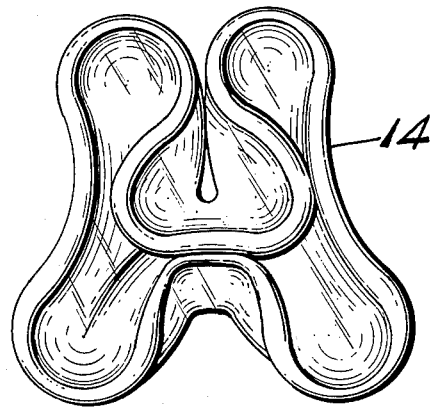
INVENTOR.
CHARLES W. CARLSON
BY
Bean Brookes Buckley & Bean
ATTORNEYS United States Patent Office 2,754,629
Patented July 17, 1956

2,754,629

METHOD OF MAKING GLASSWARE ARTICLE

Charles W. Carlson, Tiffin, Ohio

Application August 5, 1954, Serial No. 448,026

11 Claims. (Cl. 49—85)

This invention relates to the manufacture of decorative glass articles and more particularly to hand fabrication of such articles as vases, bowls and similar articles.

In general, most high grade glass articles of this general class are hand fabricated and fashioned and in nearly all cases the manufacture involves the hand blowing of a gob or gather of glass into a bubble which is shaped in a mold during the blowing operation. Following such formation the end of the bubble which is attached to the blowtube is removed and generally trimmed to form the mouth or open end of the article, with such further reheating and fashioning or fabrication of the article as the design may require.

The present invention provides a method of hand-fabricating a hollow-ware article wherein the bowl or body of the article is entirely fabricated and fashioned without blowing such body and without the usual top-severing operation by which a blown bubble of glass is converted to a bell or bowl.

Speaking generally, the present invention comprises initially forming a discoidal member of considerable diametral extent which is engaged or supported at or near its central portion by a blowtube, punty or similar implement, and then applying to the radially projecting portions inertia, gravity or centrifugal forces which act, without any physical contact with the hot glass, to cause the same to assume unique decorative conformations. This latter treatment is such that no further manipulation or forming is required as to the body or edge portions of the article, although further individual treatment of articles formed by the general method of the present invention is permissible where desired.

The accompanying drawing and the following detailed description set forth a typical embodiment of the method of the present invention and an article made thereby but it is to be understood that this disclosure is by way of example only and that various modifications in the method and resultant article may be made without departing from the spirit or scope of the invention as defined in the appended claims.

In the drawing:

Fig. 1 is a somewhat schematic representation of an initial step in one form of the method of the present invention wherein a gob or gather of hot glass has been stuck onto or against a gob or gather which is already held by a blowtube or punty;

Fig. 2 shows the final product resulting from the principal fabricating step of the present method in inverted position;

Fig. 3 is an end view of the article of Fig. 2 viewed from the bottom of Fig. 2 which is really the top of the article; and Fig. 4 is a cross-sectional view taken approximately on the line IV—IV of Fig. 2.

In pursuing the exemplary form of the method of the present invention which is set forth herein by way of example, a gob or gather of hot glass is applied and adheres to a blowtube or punty 10 as at 11 in Fig. 1 and a second gob is applied to the gob 10 as shown at 12 in Fig. 1. This second gob is then fashioned into a discoidal member as shown in dot and dash lines at 13 in Fig. 1 and in this fashioning step the worker pursues the same method that is well known and widely practiced in the hand fabrication of glass hollow ware in forming what is known as a foot on a goblet or other article.

The artisan continuously rotates the blowtube or punty and applies a tool to the glass to form the discoidal member. The continuous rotation, in addition to its function in forming the discoidal member, generates sufficient centrifugal force to maintain the hot glass in the flat discoidal form indicated at 13 in Fig. 1.

Following the fashioning of the foot-like discoidal member 13 the glass thereof will have cooled sufficiently to require "warming in" by introducing the same into the glory hole of a reheating furnace. It will be understood by those skilled in the hand glass working art that a formation like the discoidal member 13 would not be self-sustaining, particularly after reheating.

To maintain the discoidal member 13 in a plane at right angles to the blowtube or punty the latter is rotated by the workmen continuously during and following the reheating to maintain a sufficient degree of centrifugal force to hold the discoidal member in the aforesaid flat condition at right angles to the blowtube or punty at all times prior to the final fabricating step which will presently be described. This rotation is maintained regardless of the position of the blowtube or punty, that is, whether the latter be horizontal, vertical or oblique.

Following the reheating the workman positions the blowtube generally vertically with the discoidal member at the lower end and proceeds with the vase or bowl forming manipulation which is a principal step in the method of the present invention. At this point merely ceasing to rotate the blowtube or punty will cause the soft glass of the discoidal member 13 to droop or sag at all points where it is not directly supported by its adherence to the gob 11 and more pronouncedly at and near the peripheral edges of the discoidal member. This drooping or sagging is accentuated by the workman by adding to the force of gravity on the glass which begins the drooping action.

The workman may do this by a dropping motion of the blowtube which is more or less suddenly arrested or partially arrested to cause the unsupported glass of the discoidal member 13 to droop or sag to a much more marked degree or it may be carried out by a swinging of the lower end of the blowtube in a more or less horizontal circular or elliptical path to add to the gravity forces centrifugal forces due to the swinging movement.

All or some of these manipulations may be carried on simultaneously or consecutively or by themselves and it will be found that the glass droops or sags to such an extent, if the manipulation is practiced so as to permit an extreme degree of drooping, that a vase body such as is indicated by the numeral 14 in Fig. 2 is formed. It will be noted that the marginal portions of the initial disc which form the upper portion of the vase fall into a drape form as clearly illustrated in Figs. 2 and 3.

Following this manipulation the gob 11, which may at this point be a solid gob or a partly blown ball, will be removed from the blowtube or punty in the usual manner and may then be "warmed in" or reheated to permit the same to be fashioned into any desired form of base for supporting the vase body 14. Such a foot or base is indicated by the numeral 16 in Fig. 2. Obviously, the vase body is shown in Fig. 2 in the position in which it is formed which is an inverted position of the actual finished vase body.

A vase body such as is shown in Fig. 2 is completely formed by the foregoing manipulation into the draped form illustrated in Fig. 2 and no further fabrication of the vase body is required, although variant forms and modifications may be manufactured by any desired subsequent or additional working or manipulation of the glass.

Other shapes of hollow glassware, such as vases of less height and greater diameter and bowls of various shapes may be formed by the method described above by applying more or less of the drooping action described above and by proportioning the discoidal member 13 in various ways as to diameter, thickness and variation in thickness from the center portion outward.

The degree of plasticity to which the discoidal member 13 is brought in reheating will of course also have a known effect on the fluidity of the glass and the shape which it will assume in the above general fabricating procedure.

What is claimed is:

1. A method of making hollow glass articles which comprises forming a discoidal member of hot plastic glass at the end of a manipulating rod with the discoidal member lying in a plane generally at right angles to the rod and engaged thereto at its central portion, reheating the discoidal member to a soft plastic condition while rotating the rod on its axis to maintain the unsupported marginal portions of the discoidal member in generally flat position by centrifugal force, and causing the mass of the unsupported portions of said discoidal member to act in a direction generally parallel to the manipulating rod and away from the central connection of the glass therewith whereby the discoidal formation sags to form a hollow article with the marginal edges thereof falling into a drape-like configuration.

2. A method of making hollow glass articles which comprises supporting a discoidal member of hot plastic glass at the end of a manipulating rod with the discoidal member lying in a plane generally at right angles to the rod and engaged thereto in the vicinity of its central portion, heating the discoidal member to a soft plastic condition while rotating the rod on its axis to maintain unsupported marginal portions of the discoidal member in generally flat position by centrifugal force, and causing the mass of the unsupported portions to said discoidal member to act in a direction generally parallel to the manipulating rod and away from the connection of the glass therewith whereby the unsupported portions of the discoidal formation sag to form a hollow article with the marginal portions thereof falling into a generally circular drape-like configuration.

3. A method of making hollow glass articles which comprises forming a discoidal member of hot plastic glass of diminishing thickness from its center to its edge portions at the end of a manipulating rod with the discoidal member lying in a plane generally at right angles to the rod and engaged thereto at its central portion, reheating the discoidal member to a soft plastic condition while rotating the rod on its axis to maintain the unsupported marginal portions of the discoidal member in generally flat position by centrifugal force, and causing the mass of the unsupported portions of said discoidal member to act in a direction generally parallel to the manipulating rod and away from the connection of the glass therewith whereby the discoidal formation sags to form a hollow article with the marginal edges thereof falling into a drape-like configuration.

4. A method of making hollow glass articles which comprises supporting a discoidal glass member of diminishing thickness from its center to its edge portions at the end of a manipulating rod with the discoidal member lying in a plane generally at right angles to the rod and engaged thereto at its central portion, heating the discoidal member to a soft plastic condition while rotating the rod on its axis to maintain the unsupported marginal portions of the discoidal member in generally flat position by centrifugal force, and causing the mass of the unsupported portions of said discoidal member to act in a direction generally parallel to the manipulating rod and away from the connection of the glass therewith whereby the unsupported portions of the discoidal formation sag to form a hollow article with the marginal edges thereof falling into a drape-like configuration.

5. A method of making hollow glass articles which comprises forming a generally flat member of hot plastic glass at the end of a manipulating rod with the member lying in a plane generally at right angles to the rod and engaged thereto at its central portion, reheating the member to a soft plastic condition while maintaining the unsupported marginal portions of the member in generally flat condition and then causing the mass of the unsupported portions of said member to act in a direction generally parallel to the manipulating rod and away from the connection of the glass therewith whereby the member sags to form a hollow article with the marginal portions thereof falling into a drape-like configuration.

6. A method of making hollow glass articles which comprises forming a discoidal member of hot plastic glass at the end of a manipulating rod with the discoidal member lying in a plane generally at right angles to the rod and engaged thereto at its central portion, reheating the discoidal member to a soft plastic condition while rotating the rod on its axis to maintain the discoidal member in generally flat position by centrifugal force, and moving the discoidal member to impart momentum thereto in a direction generally parallel to the manipulating rod and away from the connection of the glass therewith whereby the discoidal formation sags to form a hollow article with the marginal edges thereof falling into a drape-like configuration.

7. The method of making an ornamental hollow glass article which comprises hand fashioning a gather of hot glass into discoidal shape while supporting the same at its central portion, reheating the glass while rotating the same to maintain the discoidal form of the softening glass, then causing the softened glass to sag in a direction away from its point of support in the general direction of its axis to form a decorative hollow article wherein the supported portion is the base of the article and the sagging marginal portions of the initial discoidal shape form the top rim of the article.

8. The method of making a glass article which comprises hand fashioning a gather of hot glass into discoidal shape while supporting the same at its central portion, reheating the glass while rotating the same to maintain the discoidal form of the softening glass, then causing the softened glass to sag in a direction away from its point of support in the general direction of its axis whereby the unsupported marginal portions fall into a drape-like configuration to form a decorative hollow article.

9. The method of making a glass article which comprises hand fashioning a gather of hot glass into discoidal shape of diminishing thickness toward its edge portions while supporting the same at its central portion, reheating the glass while rotating the same to maintain the discoidal form of the softening glass, then causing the softened glass to sag in a direction away from its point of support in the general direction of its axis to form a decorative hollow article wherein the supported portion is the base of the article and the sagging marginal portions of the initial discoidal shape form the top rim of the article.

10. The method of making a glass article which comprises hand fashioning a gather of hot glass into a generally flat plate-like shape while supporting the same in the vicinity of its central portion, reheating the glass while rotating the same to maintain the flat plate-like form of the softening glass, then causing the softened glass to sag in a direction away from its point of support and generally at right angles to its flat extent to form a decorative hollow article wherein the supported portion is the base of the article and the sagging marginal portions of the initial discoidal shape form the top rim of the article.

11. The method of making a glass article which comprises hand fashioning a supply of glass into generally flat plate-like extent and supporting the same at its central portion, heating the glass while maintaining the plate-like form of the softening glass, then causing the softened glass to sag in a direction away from its point of support in the general direction of its axis to form a decorative hollow article wherein the supported portion is the base of the article and the sagging marginal portions of the initial plate-like shape form the top rim of the article.

References Cited in the file of this patent

Encyclopedia Britannica, 11th ed., vol 12, 1910, page 91, col. 1, lines 17–19 and 32–40.